(12) United States Patent
Baccelli

(10) Patent No.: US 8,573,649 B2
(45) Date of Patent: Nov. 5, 2013

(54) PASSENGER AUTOMOBILE WITHOUT B-COLUMN

(75) Inventor: Gian Luca Baccelli, Taunusstein-Orlen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/368,971

(22) Filed: Feb. 8, 2012

(65) Prior Publication Data

US 2012/0200070 A1 Aug. 9, 2012

(30) Foreign Application Priority Data

Feb. 9, 2011 (DE) .......................... 10 2011 010 705

(51) Int. Cl.
*B60R 22/00* (2006.01)
(52) U.S. Cl.
USPC ........................................ 280/808; 280/730.2
(58) Field of Classification Search
USPC .................................... 280/730.2, 808, 730.1
See application file for complete search history.

(56) References Cited

U.S. PATENT DOCUMENTS

| | | | |
|---|---|---|---|
| 3,961,807 A | 6/1976 | Maki et al. | |
| 5,416,700 A | 5/1995 | Bates et al. | |
| 5,868,452 A | 2/1999 | Grieger | |
| 6,065,776 A * | 5/2000 | Toyota et al. | 280/801.1 |
| 6,655,718 B2 * | 12/2003 | Eusebi | 280/801.1 |
| 6,918,315 B2 | 7/2005 | Noeth et al. | |
| 7,167,085 B2 | 1/2007 | Meyer et al. | |
| 2009/0001695 A1 * | 1/2009 | Suzuki et al. | 280/730.2 |
| 2011/0067515 A1 | 3/2011 | Rake et al. | |

FOREIGN PATENT DOCUMENTS

| | | |
|---|---|---|
| DE | 3929268 A1 | 3/1991 |
| DE | 4001119 A1 * | 7/1991 |
| DE | 69308685 T2 | 10/1997 |
| DE | 10211968 A1 | 10/2003 |
| DE | 10223854 A1 | 12/2003 |
| DE | 10311281 B3 | 10/2004 |
| DE | 102005049212 A1 | 4/2007 |
| EP | 0665141 A1 | 8/1995 |

(Continued)

OTHER PUBLICATIONS

German Patent Office, German Search Report for Application No. 102011010705.3, dated Sep. 26, 2011.

(Continued)

*Primary Examiner* — Faye M. Fleming
(74) *Attorney, Agent, or Firm* — Ingrassia Fisher & Lorenz, P.C.

(57) ABSTRACT

A passenger automobile without B-column is provided that has front side doors and rear side doors. Two front individual seats are arranged in the area of the front side doors and a rear seat arrangement is arranged in the area of the rear side doors. A column for accommodating three-point safety belts for the individual seats is mounted between the individual seats in the area of backrests of the individual seats. This column is mounted in the floor of the vehicle. The shoulder belt of the respective safety belt is mounted in the area of the upper end of the column and the lap belt of the respective safety belt is mounted in the area of the lower end of the column. In a passenger automobile without B-column, a structurally simple safety belt arrangement is provided that has a favorable design for the front individual seats.

14 Claims, 5 Drawing Sheets

(56) References Cited

FOREIGN PATENT DOCUMENTS

| | | | |
|---|---|---|---|
| GB | 2461299 | A | 12/2009 |
| JP | 11091506 | A | 4/1999 |
| WO | 2009140959 | A1 | 11/2009 |

OTHER PUBLICATIONS

UK IPO, British Search Report for Application No. 1201366.0, dated May 29, 2012.

* cited by examiner

PASSENGER AUTOMOBILE WITHOUT B-COLUMN

CROSS-REFERENCE TO RELATED APPLICATION

This application claims priority to German Patent Application No. DE 10 2011 010 705.3, filed Feb. 9, 2011, which is incorporated herein by reference in its entirety.

TECHNICAL FIELD

The technical field relates to a passenger automobile without B-column.

BACKGROUND

Passenger automobiles are known that do not have a B-column These passenger automobiles have front and rear side doors, and with two front individual seats arranged in the area of the front side doors and a rear seat arrangement arranged in the area of the rear side doors. Since the B-column is not between the front and rear seat arrangements on the respective side of the passenger automobile, there is no possibility of mounting the three-point safety belt assigned to the respective individual seat in the area of the B-column with respect to the shoulder belt and the lap belt.

It is therefore proposed, in practice, to mount the respective safety belt in the assigned rear side door or, in the area of the adjacent front side door, to mount it directly in the individual seat. Arranging a column for accommodating three-point safety belts for the individual seats between two individual seats of a passenger automobile, in the area of backrests of the individual seats, is known from U.S. Pat. No. 3,961,807.

At least one object is to provide a structurally simple safety belt arrangement having a favorable design for the front individual seats in a passenger automobile without B-column. In addition, other objects, desirable features, and characteristics will become apparent from the subsequent summary and detailed description, and the appended claims, taken in conjunction with the accompanying drawings and this background.

SUMMARY

In a passenger automobile that is implemented without B-column on the respective vehicle side, a column for accommodating three-point safety belts for the individual seats is arranged between the individual seats in the area of the backrests of the individual seats. This column is mounted in the floor of the vehicle, which is understood as a direct or indirect mounting. The column can thus certainly also be mounted in a central console of the vehicle. The shoulder belt of the respective safety belt is mounted in the area of the upper end of the column and the lap belt of the respective safety belt is mounted in the area of the lower end of the column. It is therefore not necessary to perform special reinforcements, in particular on the individual seats or the side doors, in order to absorb forces, which are introduced into the respective safety belt. These forces are essentially absorbed by the column, which is accordingly to be stably mounted in the floor of the vehicle.

The belt buckle for the respective safety belt is preferably mounted on the individual seat on the side thereof facing away from the column. Therefore, upon introduction of forces into the safety belt, partial forces are introduced into the individual seat. This belt buckle is particularly arranged in the area of the transition from the seat part to the backrest of the individual seat. It is fundamentally possible to mount the belt buckle directly in the floor of the vehicle.

A column in the meaning of the invention is understood as a component whose extension perpendicular to the floor is substantially greater than the extension in the longitudinal direction of the passenger automobile. The column is preferably designed as narrow, in particular over its entire length or at least its upper half. In the latter case, the column is designed as narrow in the upper half and widens in the direction of the dashboard of the passenger automobile. This widened design is advantageous under the aspect of introducing forces into the floor of the vehicle upon introduction of forces into the respective safety belt.

It is considered expedient if the column, starting from the floor, is arranged slightly inclined to the rear in relation to the vertical. In particular, the column assumes such a slightly inclined attitude, which essentially corresponds to the typical inclination of a backrest upon use during travel. The column preferably extends at least up to a height level that corresponds to the height level of the upper end of the backrest of the individual seat, in particular the upper end of a head support connected to the backrest of the individual seat. If the upper end of the respective safety belt is arranged in the area of the upper end of the column, it is therefore ensured that the shoulder belt optimally extends above the shoulder of the vehicle occupant in a safety-relevant manner.

The safety belts are preferably mounted symmetrically in the column in relation to a vertical plane between the two individual seats. In case of load or a crash, approximately identical force introduction points of the two safety belts into the column therefore result. It is particularly provided that the column accommodates two retractor units for the two shoulder belts in the area of its upper end.

According to an embodiment, it is provided that at least one airbag is integrated in the column. The number of the airbags integrated in the column and their arrangement is selected differently in this case. Thus, one airbag is preferably integrated in the column on its front side, in particular below the upper mounting point for the shoulder belts. Upon triggering of the airbag, it reaches the area in front of the column between driver and passenger. In particular in the event of a side crash, the head of the respective occupant is effectively prevented from being traumatized in particular, whether by striking of the head on the adjacent individual seat or, in the worst case, by striking on a body part or the head of the occupant seated on the adjacent individual seat.

Furthermore, it is preferably provided that at least one airbag is integrated in the column on its rear side. This airbag is active in the direction of the vehicle interior located between the two individual seats. It is considered to be particularly advantageous if two airbags arranged adjacent to one another are integrated in the column on its rear side. These can trigger individually to the rear, in particular can trigger diagonally to the rear, so that the vehicle occupants seated in the area behind the individual seats plunge into the triggered airbags in the event of a frontal impact of the passenger automobile. Fundamentally, it is conceivable, as described above, to cause an airbag to trigger to the rear, into the area between the rear vehicle occupants, in order to protect them in the event of a side crash.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
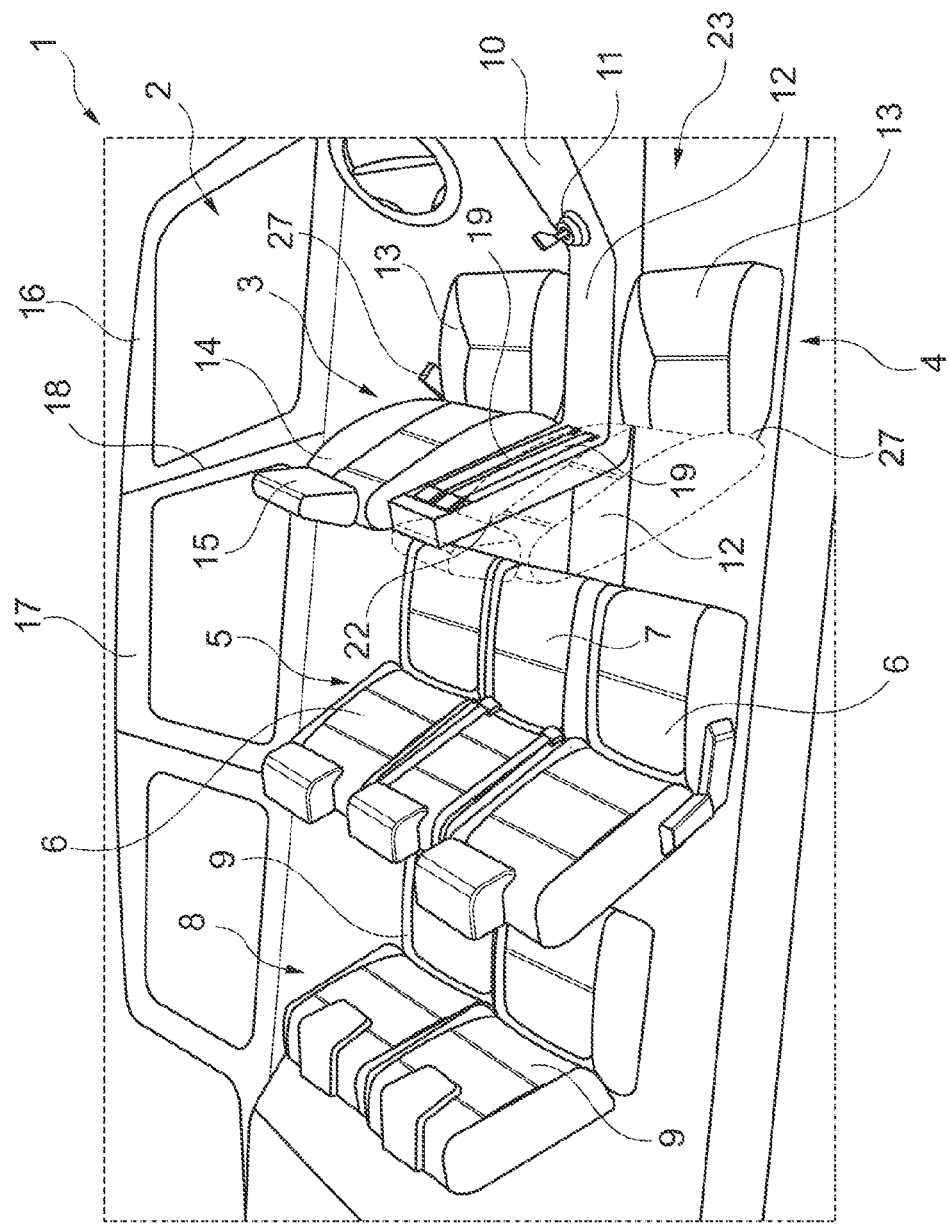
FIG. 1 shows a passenger automobile in a view of the interior, with removed right side doors and side walls and the backrest of the right front individual seat not being shown.

The following detailed description is merely exemplary in nature and is not intended to limit the invention or the application and uses of the invention. Furthermore, there is no intention to be bound by any theory presented in the preceding background of the invention or the following detailed description.

Only the components relevant to the invention are illustrated for the passenger automobile 1, therefore not the wheels, engine, cargo space, and the like. For the passenger automobile 1, its passenger compartment 2 is shown, having front left individual seat 3 (e.g., driver seat), front right individual seat 4 (e.g., passenger seat), seating arrangement 5 arranged behind the two individual seats 3 and 4, which has two outer seats 6 and a middle seat 7 located between them, and finally the third seat row 8 having two seats 9, which is arranged behind the seat arrangement 5. A central tunnel 12 extends in the middle of the passenger automobile 1, starting from the dashboard 10 and the shift lever 11 up to the rear drive axle of the passenger automobile 1.

The respective individual seat 3 or 4 has a seat part 13, a backrest 14, which is adjustable in inclination in relation to the seat part 13 and is mounted in the seat part 13, and a head support 15, which is mounted in the area of the upper end of the backrest 14 thereon. The passenger seat 4 is illustrated in the area of the seat part 13 and the contour of the backrest 14 is only indicated by dashed lines for a partial area.

On each side, the passenger automobile 1 has a front side door 16 in the area of an individual seat 3 or 4 and a rear side door 17 in the area of the seat arrangement 5. Right side doors 16 and 17 are not illustrated. The front side door 16 is pivotable around a front hinge, the rear side door 17 is pivotable around a rear hinge, so that upon opening of the doors, they are moved away from one another in the area of the partition line 18. The passenger automobile 1 does not have a B-column on the respective side, therefore in the area of the partition line 18 and thus the backrest 14 of the respective individual seat 3 or 4.

A column 22 is provided for mounting the two three-point safety belts 19 in the area of the respective shoulder belt 20 and the respective lap belt 21. This column is arranged between the two individual seats 3 and 4 in the area of their backrests 14. The column 22 is mounted in the floor 23 of the passenger automobile 1, specifically in the central tunnel 12. The column 22 is arranged, originating from the floor 23, slightly inclined to the rear in relation to the vertical, corresponding to the illustrated inclination of the backrests 14, which is typical during travel. The column 22 extends up to the height level of the upper end of the respective backrest 14. In the area of the upper end of the column 22, it is provided with two horizontally extending slots 24 arranged adjacent to one another, through which the respective shoulder belt 20 passes and is wound onto a retractor unit (not shown), which is arranged inside the column 22. Correspondingly, the column 22 is provided at the bottom with two horizontally extending slots 25 arranged adjacent to one another, through which the lap belts 21 are inserted and are connected at their ends inside the column 22 thereto. The respective safety belt 19 is provided in the area of shoulder belt 20 and lap belt 21 with a displaceable tongue 26, which is inserted into a belt buckle 27 and locked thereto in the usage position of the respective safety belt 19. This belt buckle 27 is mounted on the side of the respective individual seat 3 or 4 facing away from the column 22 in the seat part 13 adjacent to the backrest 14. Upon adjustment of the seat part forward or backward, this belt buckle 27 accordingly also moves. Fundamentally, the respective belt buckle 28 can also be mounted in this area, but in the floor 23.

Figure 2:
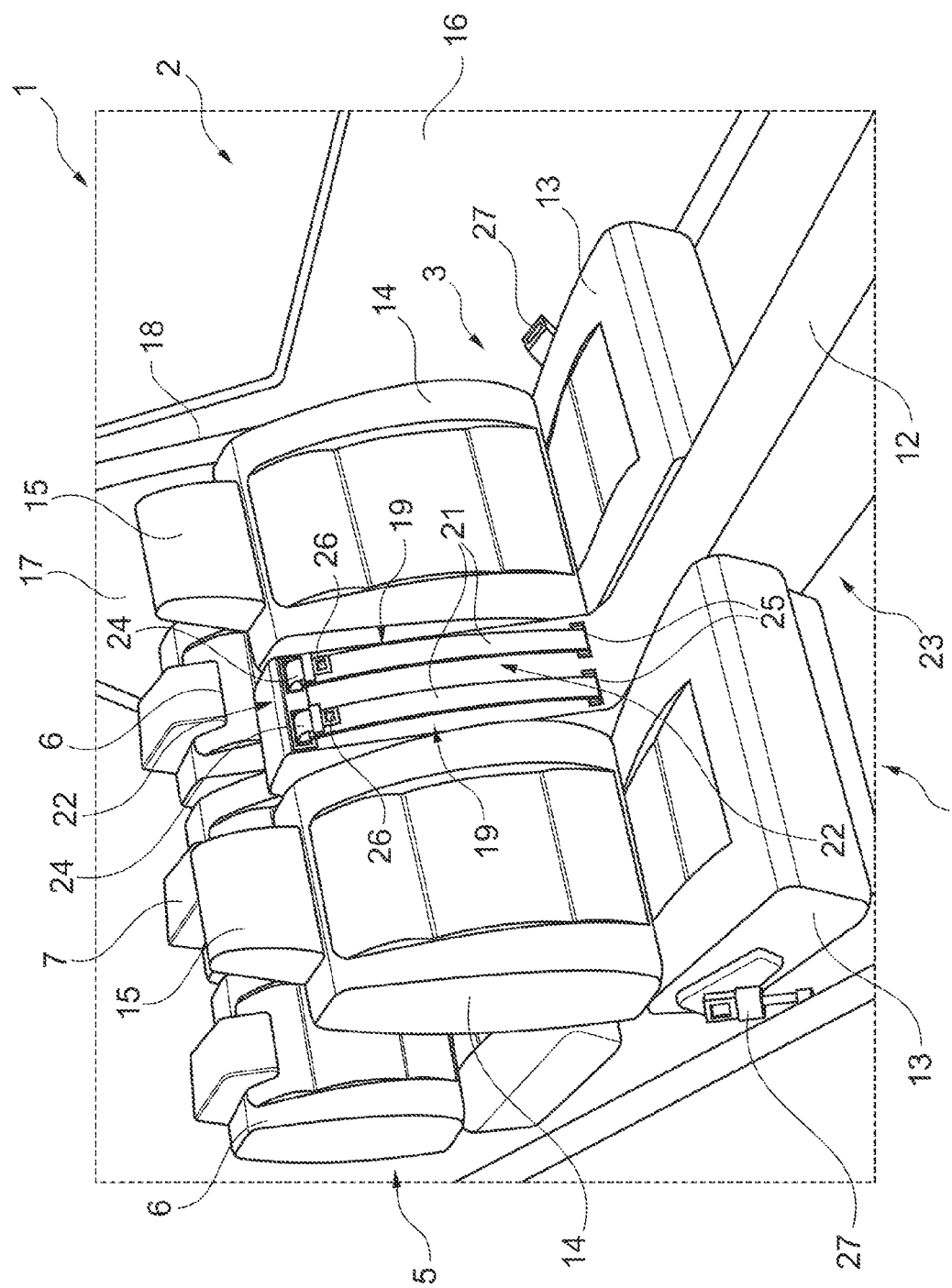
FIG. 2 shows a view of the vehicle interior, looking diagonally from the front toward the front individual seats, in the non-usage position of the safety belts of the front individual seats.
Figure 3:
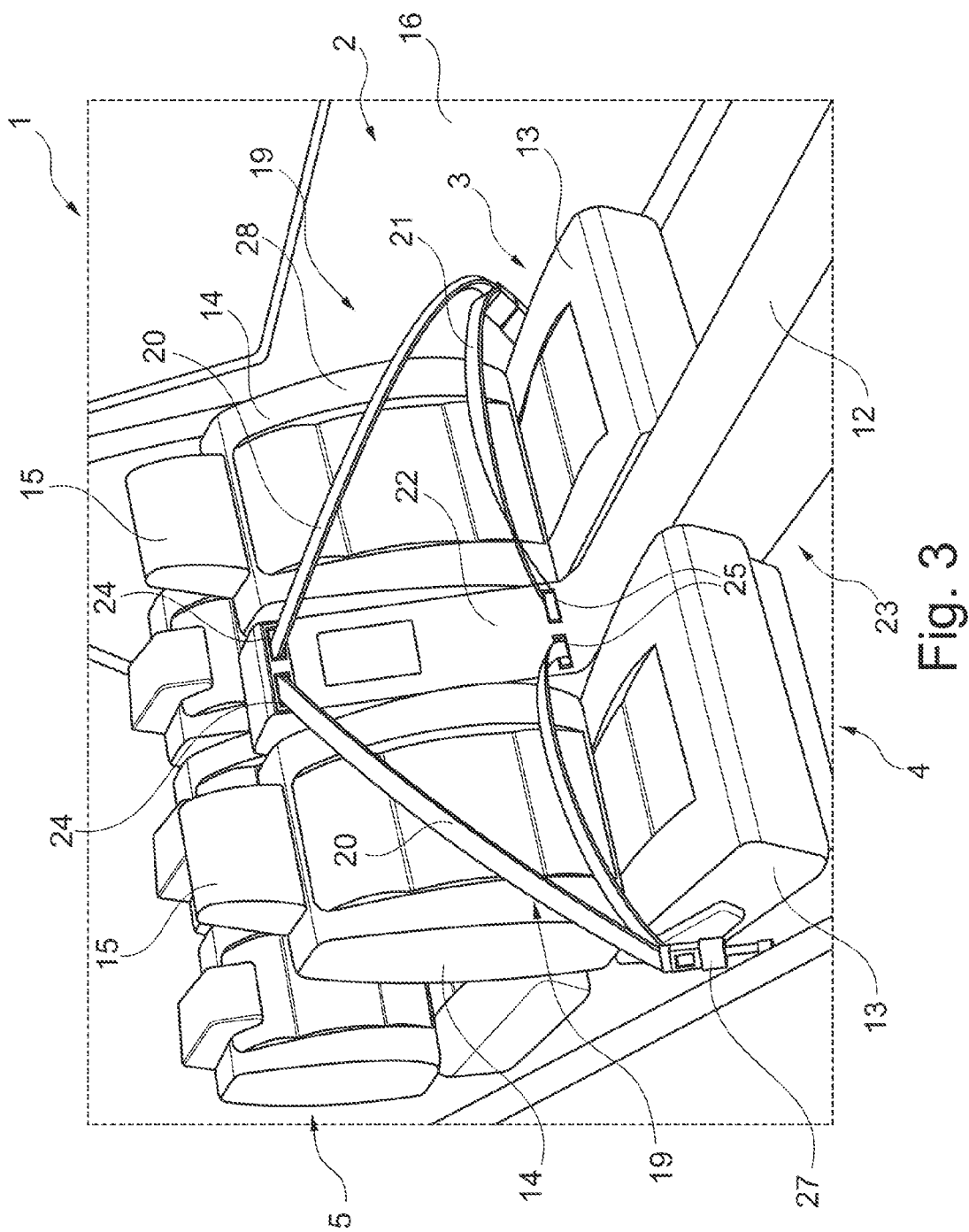
FIG. 3 shows a view according to FIG. 2, illustrated in the usage position of the safety belts of the front individual seats.

It can be inferred from the illustration in FIG. 2 in particular that the two safety belts 19 are mounted symmetrically in the column 22 with respect to the vertical plane between the two individual seats 3 and 4. It can be inferred from the illustration of the usage position of the safety belts 19 according to FIG. 3 that an airbag 28 is integrated in the column 22, slightly below the upper slots 24. Upon triggering, the airbag is moved forward, into the area between driver and passenger.

Figure 4:
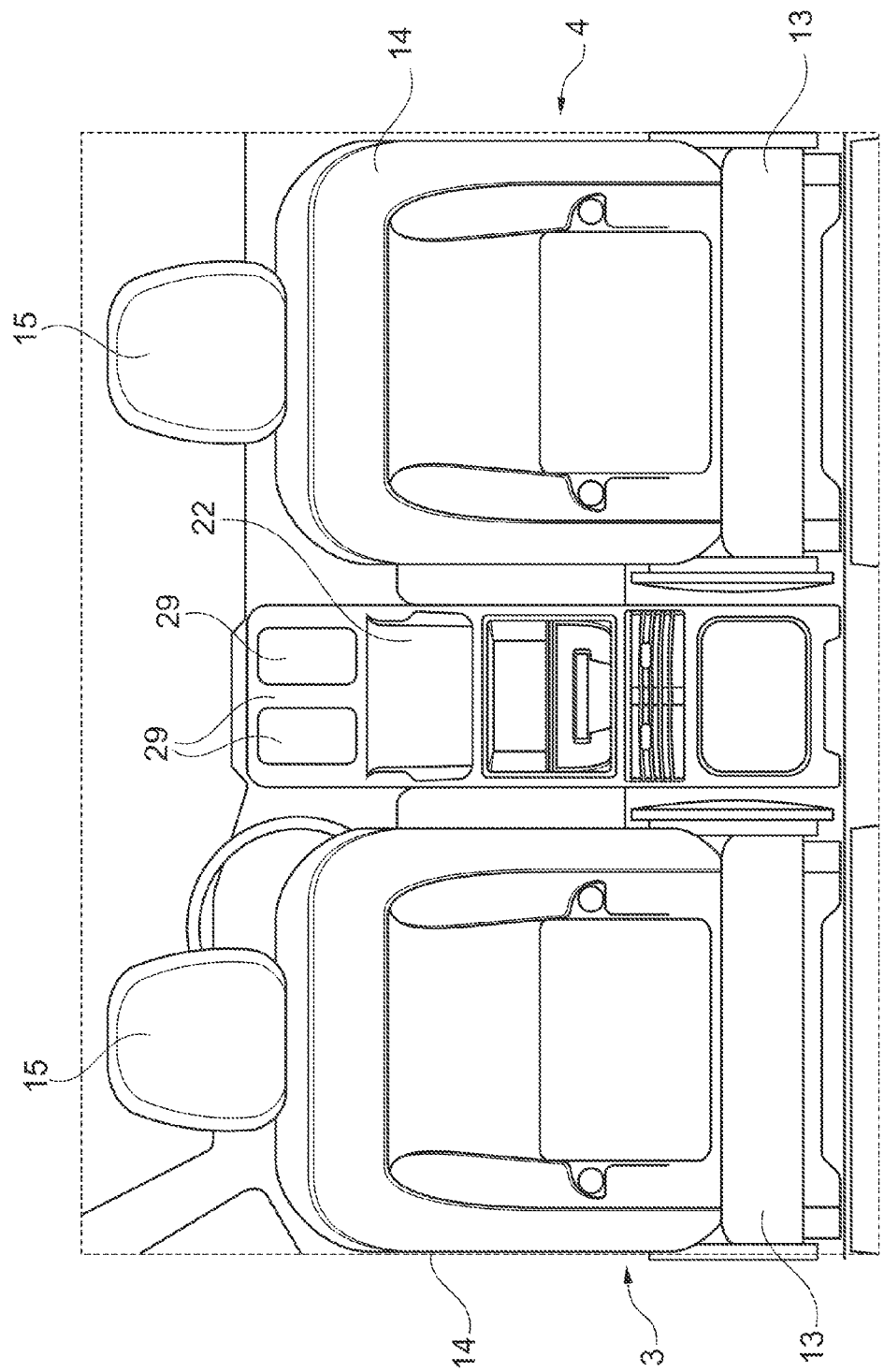
FIG. 4 shows a view of the vehicle interior, observed from the rear of the two individual seats.
Figure 5:
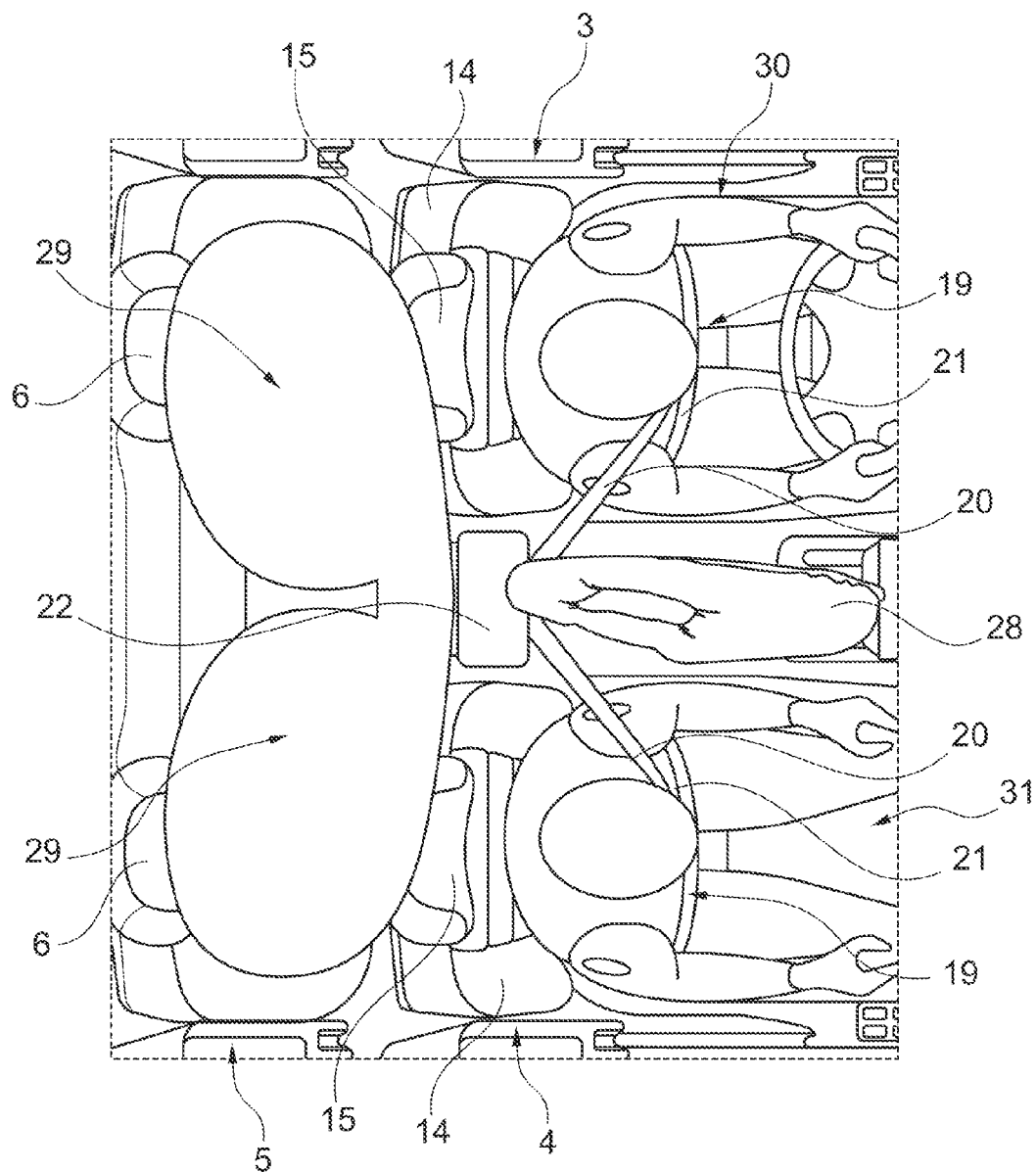
FIG. 5 shows a top view of the vehicle interior, in the area of the two front individual seats and the seat arrangement located behind it, with occupied individual seats and triggered airbags.

It can be inferred from the illustration of FIG. 4 that two airbags 29, 30 arranged adjacent to one another are integrated in the column 22, on its rear side, in the area of its upper end. These trigger individually in case of crash, diagonally to the rear, each having main triggering direction toward the occupants of the outer seats 6 of the seat arrangement 5. The situation upon triggering of front airbag 28 and both rear airbags 29 is illustrated in FIG. 5. It is shown that the front airbag 28 reaches the area between buckled-in driver 30 and buckled-in passenger 31. The rear airbags 29 open in the direction of the outer seats 6.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A passenger automobile without a B-column, comprising:
   a front door;
   a rear side door;
   two front individual seats that are arranged in an area of the front door;
   a rear seat arrangement that is arranged in an area of the rear side door; and
   a column that is arranged between the two front individual seats in an area of backrests of the two front individual seats and mounted in a floor and is slightly inclined to a rear in relation to a vertical starting from the floor, which is configured to accommodate three-point safety belts for the two front individual seats;
   a shoulder belt for each of the three-point safety belts that is mounted in the area of an upper end of the column; and a lap belt of for each of the three-point safety belts is mounted in a lower end of the column.

2. The passenger automobile according to claim 1, further comprising a belt buckle for each of the three-point safety belts that is mounted on the two front individual seats on a side facing away from the column.

3. The passenger automobile according to claim 1, wherein the column is mounted directly in the floor.

4. The passenger automobile according to claim 1, wherein the column is mounted directly in a central console.

5. The passenger automobile according to claim 1, wherein the column is mounted directly in a central tunnel.

6. The passenger automobile according to claim 1, wherein the column extends at least to a height level that corresponds to a height level of an upper end of a backrest.

7. The passenger automobile according to claim 1, wherein the column extends at least to a height level that corresponds to a height level of an upper end of a head support connected to a backrest.

8. The passenger automobile according to claim 1, wherein the three-point safety belts are mounted in a substantially symmetric manner in the column with respect to a vertical plane between the two front individual seats.

9. The passenger automobile according to claim 1, further comprising two retractor units accommodated in the column for the shoulder belt in the area of an upper end.

10. The passenger automobile according to claim 1, further comprising an airbag that is integrated in the column.

11. The passenger automobile according to claim 10, wherein the airbag is integrated in the column on a front side, below an upper mounting point for the shoulder belt.

12. The passenger automobile according to claim 10, wherein the airbag is integrated below an upper mounting point for the shoulder belt.

13. The passenger automobile according to claim 1, further comprising an airbag integrated in the column on a rear side.

14. The passenger automobile according to claim 13, further comprising two airbags arranged adjacent to one another that are integrated in the column on a rear side.

* * * * *